United States Patent

Takamura (10) Patent No.: US 11,113,833 B2
(45) Date of Patent: Sep. 7, 2021

(54) OBJECT DETECTION SYSTEM (71) Applicant: KONICA MINOLTA, INC., Tokyo (JP)

(72) Inventor: Shunsuke Takamura, Tama (JP)

(73) Assignee: KONICA MINOLTA, INC., Tokyo (JP)

(*) Notice: Subject to any disclaimer, the term of this patent is extended or adjusted under 35 U.S.C. 154(b) by 33 days.

(21) Appl. No.: 16/493,121

(22) PCT Filed: Mar. 5, 2018

(86) PCT No.: PCT/JP2018/008370
§ 371 (c)(1),
(2) Date: Sep. 11, 2019

(87) PCT Pub. No.: WO2018/168552
PCT Pub. Date: Sep. 20, 2018

(65) Prior Publication Data
US 2020/0118284 A1 Apr. 16, 2020

(30) Foreign Application Priority Data
Mar. 14, 2017 (JP) .............................. JP2017-048587

(51) Int. Cl.
G06T 7/579 (2017.01)
G06T 7/521 (2017.01)
(Continued)

(52) U.S. Cl.
CPC ............. G06T 7/579 (2017.01); G01S 17/89 (2013.01); G06T 7/246 (2017.01); G06T 7/521 (2017.01)

(58) Field of Classification Search
CPC ........ G06T 7/579; G06T 7/521; G06T 7/246; G06T 2207/30232; G06T 2207/10028;
(Continued)

(56) References Cited

U.S. PATENT DOCUMENTS

2011/0164185 A1* 7/2011 Park .................... G06T 7/254
348/586
2016/0292522 A1 10/2016 Chen et al.
2017/0206423 A1* 7/2017 Ju ......................... G06T 7/11

FOREIGN PATENT DOCUMENTS

EP 1772752 A1 4/2007
JP 2004191095 A 7/2004
(Continued)

OTHER PUBLICATIONS

International Search Report corresponding to Application No. PCT/JP2018/008370; dated May 1, 2018.
(Continued)

Primary Examiner — Chan S Park
Assistant Examiner — Daniel C Chang
(74) Attorney, Agent, or Firm — Cantor Colburn LLP (57) ABSTRACT An object detection system includes a depth image detector and a moving object extractor. The depth image detector detects a depth image from an external environment. The moving object extractor extracts a moving object desired to be extracted from the depth image. The moving object extractor registers in advance the depth image in a memory as a background while the moving object to be extracted does not exist, and extracts only a pixel whose current depth is present on a nearer side than a depth of the background as a candidate for a pixel corresponding to the moving object to be extracted.

2 Claims, 9 Drawing Sheets (51) Int. Cl.
*G06T 7/246* (2017.01)
*G01S 17/89* (2020.01)

(58) Field of Classification Search
CPC ......... G06T 7/254; G06T 7/194; G01S 17/04;
G01S 7/4802; G01S 17/50; G01S 17/89
See application file for complete search history.

(56) References Cited

FOREIGN PATENT DOCUMENTS

| | | |
|---|---|---|
| JP | 2005300259 A | 10/2005 |
| JP | 2006064695 A | 3/2006 |
| JP | 2008275442 A | 11/2008 |
| JP | 2009085927 A | 4/2009 |
| JP | 2011185664 A * | 9/2011 |
| JP | 2011185664 A | 9/2011 |
| WO | 2016013719 A1 | 1/2016 |

OTHER PUBLICATIONS

Extended European Search Report corresponding to EP Application No. 18768274.5; dated Feb. 10, 2020.
Lee Jichan et al: "Moving object detection using background subtraction and motion depth detection in depth image sequences"; The 18th IEEE International Symposium on Consumer Electronics (ISCE 2014), Jun. 22, 2014, pp. 1-2, XP032631169.
International Preliminary Report on Patentability corresponding to Application No. PCT/JP2018/008370; dated Sep. 17, 2019.
EPO Office Action corresponding to EP Application No. 18768274.5; dated Jun. 9, 2021.

* cited by examiner

OBJECT DETECTION SYSTEM

CROSS REFERENCE TO RELATED APPLICATIONS

This is the U.S. national stage of application No. PCT/JP2018/008370, filed on Mar. 5, 2018. Priority under 35 U.S.C. § 119(a) and 35 U.S.C. § 365(b) is claimed from Japanese Patent Application No. 2017-048587, filed Mar. 14, 2017; the disclosures of which are incorporated herein by reference.

TECHNOLOGICAL FIELD

The present invention relates to an object detection system.

BACKGROUND ART

Recently, an object detection system that, for the purpose of detecting an intruder or a vehicle in a monitoring space, detects an object in a depth image detected by a laser radar or the like is used. Here, the depth image is obtained by mapping the value of a depth to the object as two-dimensional coordinates.

As a method of extracting pixels including a moving object from a depth image, a method of extracting pixels different in depth from a previously acquired background (a depth image while the moving object does not exist) is known as described in Patent Document 1 as well. A background depth map generator in Patent Document 1 generates a background depth map indicating information about a depth from a laser radar in a detection region to an object present in the background on the basis of a measurement result of the laser radar. A moving object detector detects a moving object in the detection region from a difference between the depth information in the background depth map stored in advance in a background depth map memory and the measurement result of the laser radar.

PRIOR ART DOCUMENT

Patent Document

Patent Document 1: JP 2005-300259 A

SUMMARY OF THE INVENTION

Problems to be Solved by the Invention

However, the above-described method has a problem in that even an essentially unnecessary pixel is extracted in cases as will be described below.

(1) Case where there is Reflective Object Such as Glass or Puddle

In a case where TOF (a method of measuring the time until light is reflected by an object and returns) is used as a method of measuring a depth, light emitted to a totally reflecting portion such as glass or a puddle is reflected there and reflected by an object at the destination of reflection, and returns in some cases. Then, a depth image as if there is an object behind the glass or puddle is obtained. This is a virtual image appearing at a position where an object does not exist actually, and thus is not a moving object pixel desired to be extracted. However, when extracting a portion different in depth from the background, the virtual image is also extracted as moving object candidate pixels.

Figure 10:
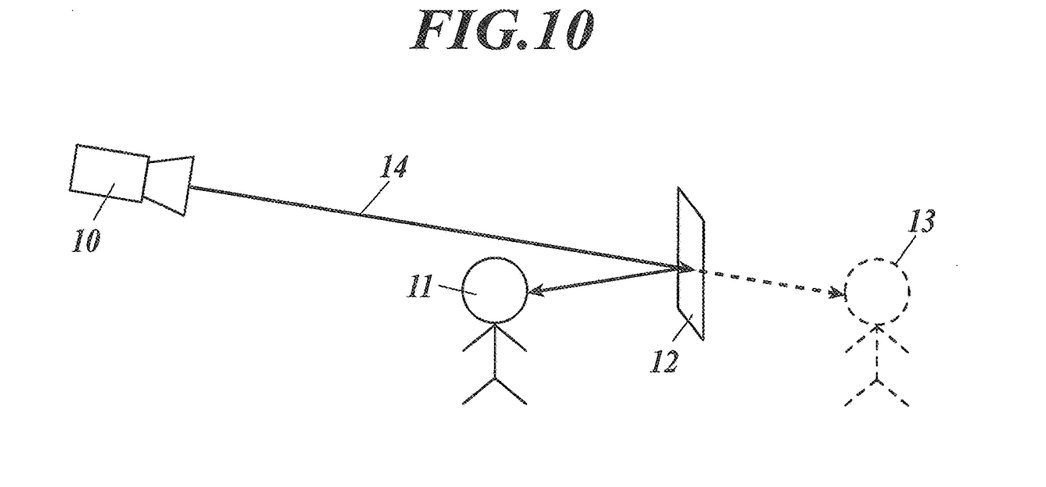
FIG. 10 is a schematic view showing a situation in which there are a person and glass in front of the depth image detection device such as a laser radar.

FIG. 10 shows a situation in which a person 11 and a glass 12 are present in front of a depth image detection device 10, such as a laser radar, that detects a depth image from an external environment. As shown in FIG. 10, when reflected light returns along an optical path 14, it looks like as if an object has appeared at a position where it does not exist actually.

Thus, when an object present at a depth different from the background is extracted with conventional techniques, this virtual image 13 is also extracted.

(2) Case where there is Object, Such as Fence, Through which Other Side is Visible In a case where there is an object, such as a fence, through which the other side is visible, a person or the like, if appearing behind the fence, is detected. (This is because light transmits through the fence, is reflected by the person behind the fence, and returns). Depending on the purpose, this is extra information in a case where it is desired to see a movement inside the fence. Since there is a depth from the background (fence), this pixel is also extracted with conventional techniques.

Figure 11A:
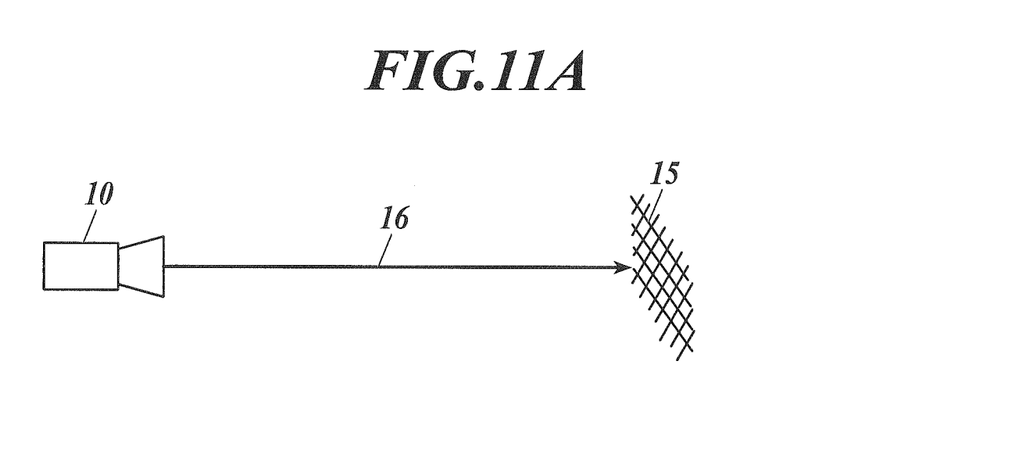
FIG. 11A is a schematic view showing a situation in which there is a mesh fence in front of the depth image detection device such as a laser radar.
Figure 11B:
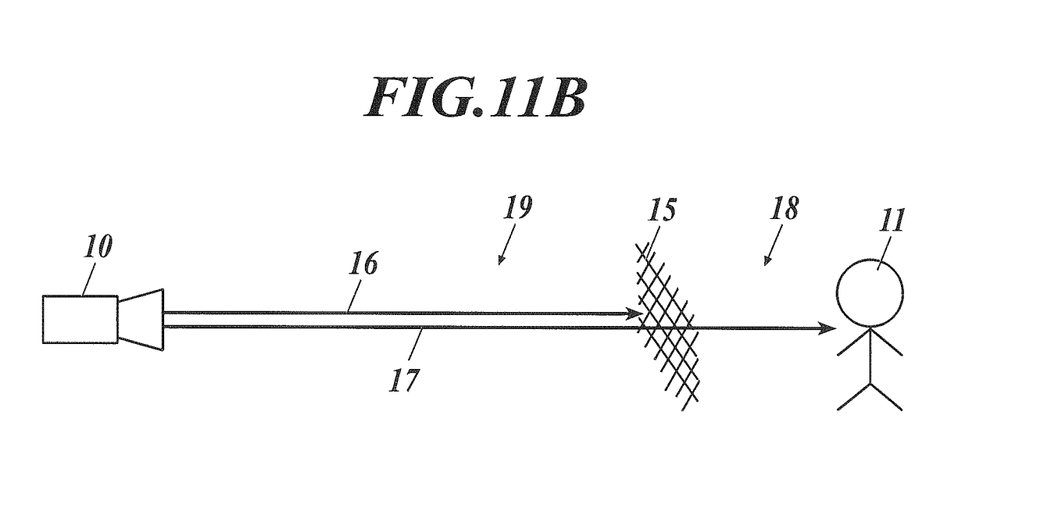
FIG. 11B is a schematic view showing a situation in which there is a mesh fence in front of the depth image detection device such as a laser radar, and a person has appeared behind that fence.

FIG. 11A and FIG. 11B show a situation in which there is a mesh fence 15 in front of the depth image detection device 10. In this case, in a case where there is no person, light returns only from the fence 15 along an optical path 16 as shown in FIG. 11A, but in a case where the person 11 appears on a farther side 18 of the fence 15 as shown in FIG. 11B, light reflected by that person 11 also returns along an optical path 17. Here, in a case where it is desired to see only a nearer side 19 than the fence 15 as seen from the depth image detection device 10, information about the person 11 in FIG. 11B is unnecessary information, but this person 11 is also extracted since a portion different from the background is extracted with conventional techniques.

(3) Case where Background Changes

This is such a case where the background frequently changes, for example, a case where it is desired to monitor a person on a platform of a station. FIG. 4 to FIG. 7 show a situation in which there are a platform 20 of a station, a track 21, and a wall 22 in front of the depth image detection device 10. If the wall 22, for example, is fixed as a background for data processing, an actual background with respect to the person changes because of a train 23 which enters/leaves the station, and that portion is entirely extracted as pixels including a moving object.

When also setting the train 23 as a part of the background for data processing, the wall 22 in a situation where the train 23 is absent is also extracted since a portion different from the background is extracted with conventional techniques.

Therefore, methods of conventional techniques do not enable only pixels including a moving object desired to be extracted, such as a person on the nearer side than the train, to be extracted.

In addition, since the train 23 is a moving object rather than a fixed object, and is not always present in a detection target range, and there is also a depth error due to a difference between vehicles, variations in stopping position, or the like, it is difficult to set the train 23 as the background for data processing.

The present invention was made in view of the above problems in the conventional techniques, and has an object to, irrespective of a background situation of a moving object desired to be extracted, accurately extract the moving object to be extracted.

Means for Solving Problems

In order to solve the above problems, the invention according to claim 1 is an object detection system including:

a depth image detector that detects a depth image from an external environment; and a moving object extractor that extracts a moving object desired to be extracted from the depth image, wherein the moving object extractor registers in advance the depth image in a memory as a background while the moving object to be extracted does not exist, and extracts only a pixel whose current depth is present on a nearer side than a depth of the background as a candidate for a pixel corresponding to the moving object to be extracted.

According to the present invention, the above-described cases (1), (2), and (3) are solved respectively as will be described below.

The above-described (1) "CASE WHERE THERE IS REFLECTIVE OBJECT SUCH AS GLASS OR PUDDLE"

Since reflected-back light returns from a place farther away than the background (glass or a puddle), its depth is greater than that of the background. Therefore, if only the nearer side than the background is extracted, these pixels are not included.

The above-described (2) "CASE WHERE THERE IS OBJECT, SUCH AS FENCE, THROUGH WHICH OTHER SIDE IS VISIBLE"

The object behind the fence has a depth greater than that of the background (fence). Therefore, if only the nearer side than the background is extracted, these pixels are not included.

The above-described (3) "CASE WHERE BACK-GROUND CHANGES"

By acquiring the background while a changing portion of the background is present in the foreground, a changed portion of the background is not extracted. For example, in a case of monitoring a platform of a station as shown in FIG. 4 to FIG. 7, if the background is acquired and registered while the train 23 is at a stop, that portion (the wall 22) does not change to the nearer side and is not extracted even if the train 23 leaves thereafter. However, the depth changes to the nearer side in a case where the person 11 stands in front of the wall 22, and thus, the person 11 is extracted. In this manner, only the person 11 on the platform 20 can be extracted.

The invention according to claim 2 is the object detection system according to claim 1, wherein the moving object extractor further makes a determination to extract, as the moving object to be extracted, a pixel from a pixel group composed of pixels of the candidates having been extracted, and for a portion not extracted as the moving object to be extracted, updates and registers a depth of the pixel in the memory as the depth of the background.

According to this invention, even in a case where it is difficult to acquire an optimum background particularly in the above-described case (3) where the background changes, and the like, the optimum background can be obtained by updating the depth of the background on the basis of information being measured.

The invention according to claim 3 is the object detection system according to claim 2, wherein the moving object extractor makes the determination in accordance with a size of a detected moving object.

According to this invention, in a case where it is desired to extract the person 11 walking on the platform 20 without setting the train 23 at the back of the platform 20 of the station as an extraction target as shown in FIG. 4 to FIG. 7, for example, in the above-described case (3), if only a moving object smaller than or equal to a size equivalent to the person 11 is set to be extracted as a "moving object desired to be extracted", the train 23 can be determined as not being a "moving object desired to be extracted" because of its size. In addition, this parameter, size, is easy to understand for a user who makes settings, and easy to adjust.

The invention according to claim 4 is the object detection system according to any one of claims 1 to 3, wherein when determining whether a pixel is present on a nearer side than the background registered in the memory, the moving object extractor sets a threshold value of a smallest changing depth, and extracts only a pixel present on a nearer side than the depth of the background by more than or equal to the threshold value as a candidate for a pixel corresponding to the moving object to be extracted.

According to this invention, a pixel accidentally located on the nearer side than the background because of an error or noise can be prevented from being extracted erroneously.

Advantageous Effects of Invention

According to the present invention as described above, irrespective of a background situation of a moving object desired to be extracted, the moving object to be extracted can be extracted accurately.

EMBODIMENTS FOR CARRYING OUT THE INVENTION

Hereinafter, an embodiment of the present invention will be described with reference to the drawings. The following is an embodiment of the present invention, and does not limit the present invention.

Figure 1:
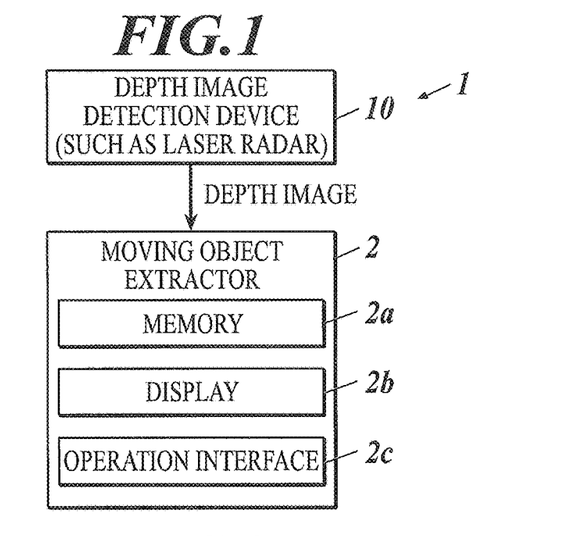
FIG. 1 is a block diagram of an object detection system according to an embodiment of the present invention.

As shown in FIG. 1, an object detection system 1 of the present embodiment includes the depth image detection device 10, such as a laser radar, as a depth image detector that detects a depth image from an external environment, and a moving object extractor 2 that extracts a moving object desired to be extracted from the depth image output by the depth image detection device 10. The moving object extractor 2 is implemented by a computer, has a memory 2a, and executes a computation which will be described below by means of a CPU.

Prior to moving object detection (flows of FIG. 2 and FIG. 3), the moving object extractor 2 acquires a depth image by means of the depth image detection device 10 while there is no obstacle such as a person in an area where detection is desired to be performed, and registers the depth image in the memory 2a as a background.

Figure 2:
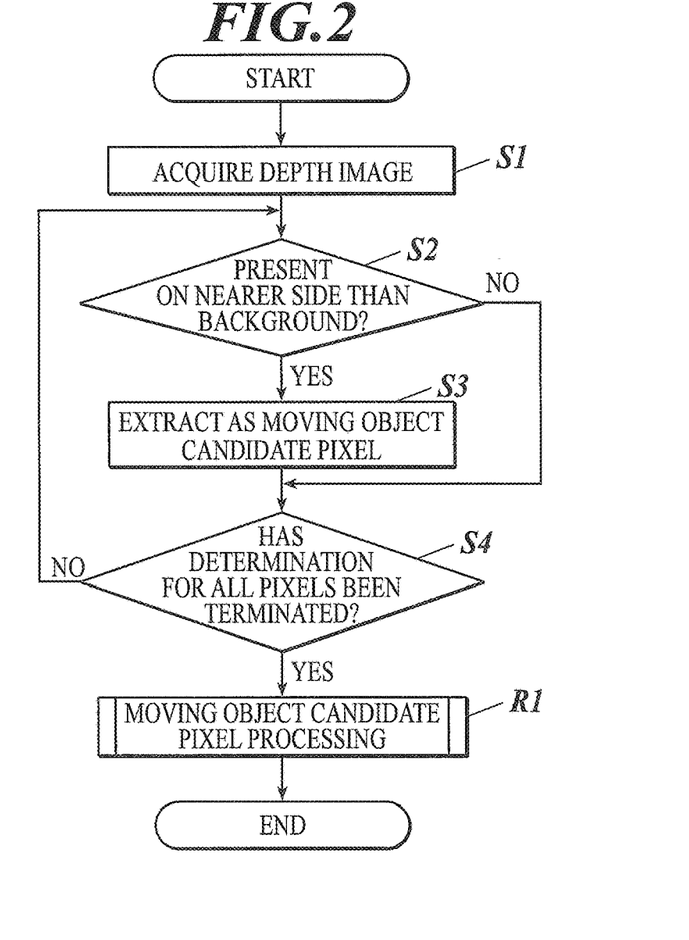
FIG. 2 is a flowchart showing a computation procedure performed by the object detection system according to the embodiment of the present invention.

After registering the background, the moving object extractor 2 acquires a depth image that the depth image detection device 10 outputs (S1) as shown in FIG. 2. The depth image is equivalent to the current depth image.

Next, the moving object extractor 2 determines whether or not the current depth in the depth image is present on the nearer side than the depth of the background registered in the memory 2a (S2). That is, in step S2, the moving object extractor 2 compares a depth value of one pixel in the current depth image acquired from the depth image detection device 10 and a depth value of a pixel in the background depth image having the same coordinates with this one pixel to determine whether or not the former is smaller.

In the case of YES in step S2, the moving object extractor 2 extracts the one pixel targeted for determination as a moving object candidate pixel (S3). The moving object candidate pixel is a candidate for a pixel corresponding to a moving object desired to be extracted.

When determining whether the depth is smaller in step S2, not only by making a direct comparison, but also a threshold value for the smallest changing depth may be set, and only a pixel present on the nearer side than the depth of the background by more than or equal to the threshold value may be extracted as a moving object candidate pixel. Accordingly, a pixel accidentally located on the nearer side than the background because of an error or noise can be prevented from being extracted erroneously.

Figure 3:
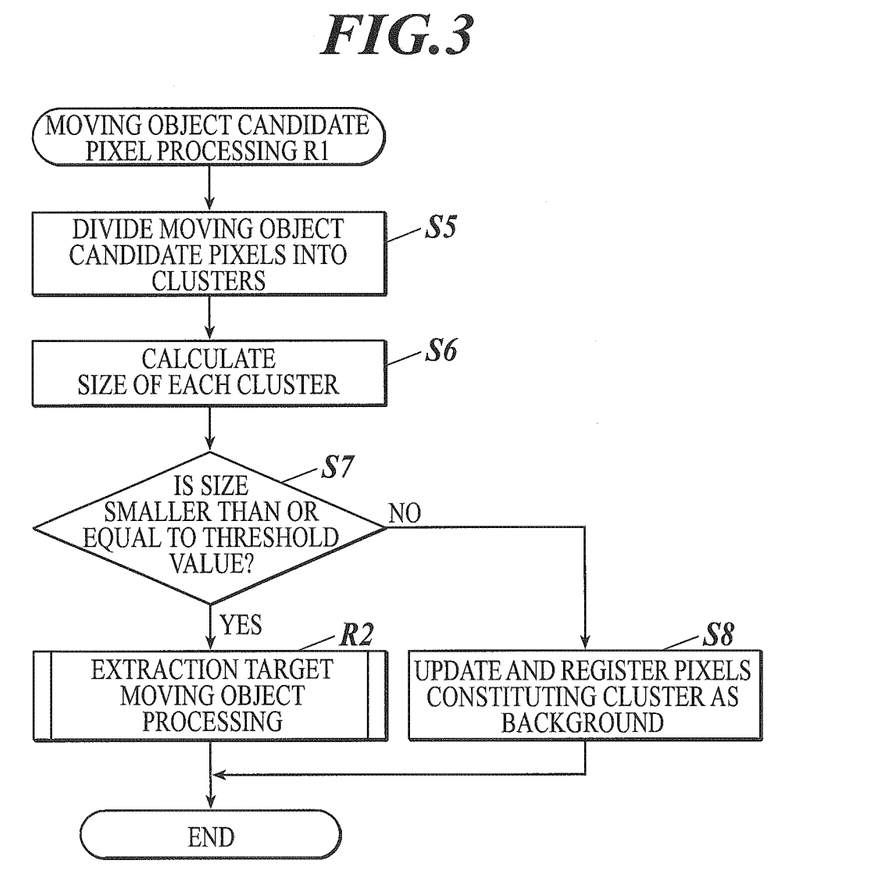
FIG. 3 is a flowchart subsequent to FIG. 2, showing a computation procedure performed by the object detection system according to the embodiment of the present invention.

Upon executing the above-described steps S2 and S3 for all the pixels (YES in S4), the moving object extractor 2 executes moving object candidate pixel processing R1 (the flow of FIG. 3).

As the moving object candidate pixel processing R1, the moving object extractor 2 divides moving object candidate pixels (pixel group) into clusters (S5) as shown in FIG. 3.

Next, the moving object extractor 2 calculates the size of each cluster (S6). For example, the moving object extractor 2 calculates a vertical dimension, a horizontal dimension, a total area, and the like. Note that the "size" refers to actual dimensions, rather than an apparent size.

The moving object extractor 2 determines whether or not the size calculated in step S6 is smaller than or equal to a predetermined threshold value for specifying a moving object to be extracted (S7).

In the case of YES in step S7, the moving object extractor 2 extracts that cluster as the moving object to be extracted, and executes extraction target moving object processing R2. The extraction target moving object processing R2 is processing such as issuing a notification if the purpose is to monitor an intruder into a predetermined area, for example, and is not particularly limited in details.

In the case of NO in step S7, the moving object extractor 2 updates and registers the depth of pixels in that cluster in the memory 2a as the depth of the background (S8).

In the present embodiment, a determination is made to recognize the cluster as a moving object to be extracted in a case where the size is smaller than a prescribed size.

Figure 8:
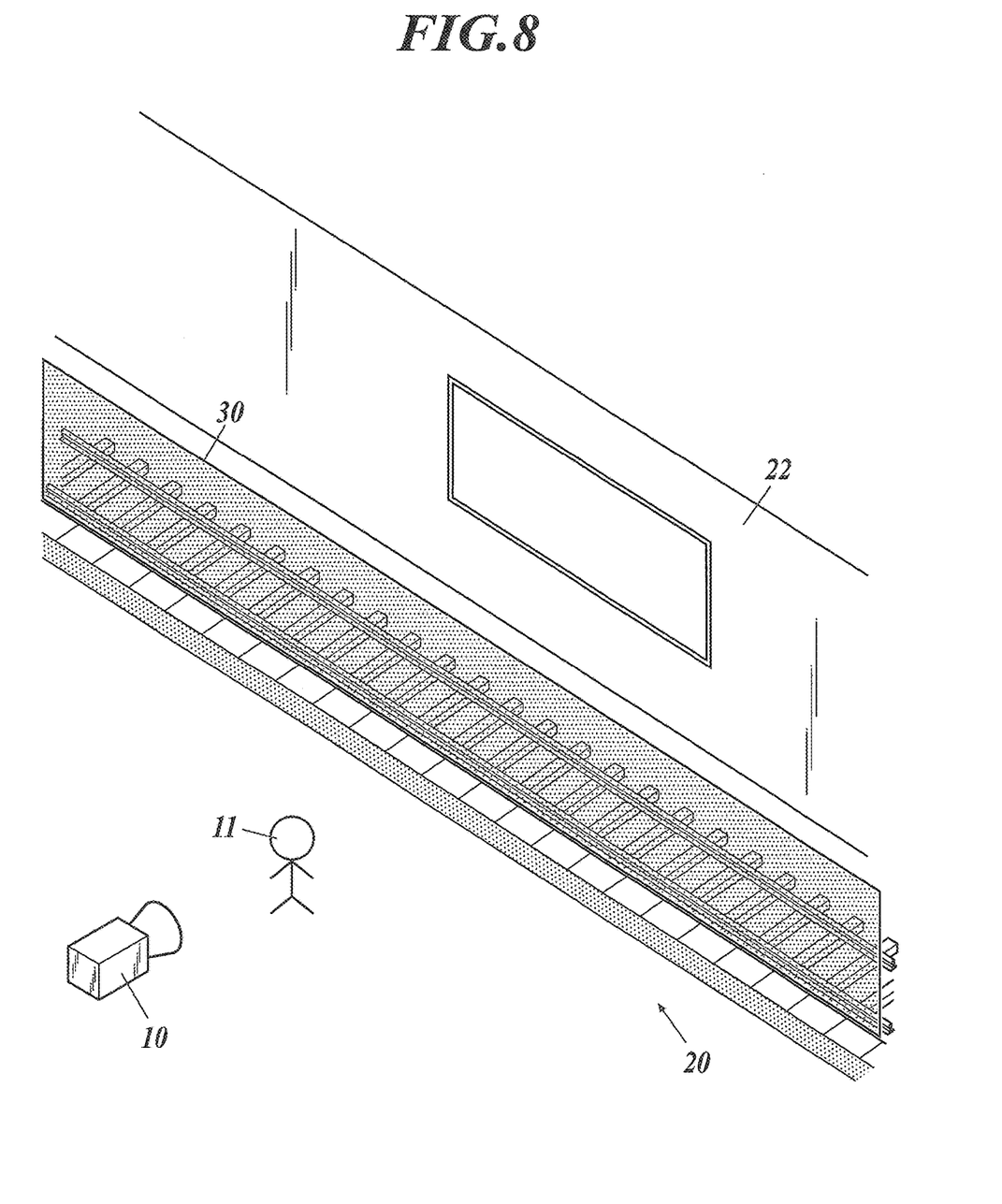
FIG. 8 is a schematic view obtained by adding a background depth image composed of a train portion to the same schematic view as FIG. 7.

Accordingly, in a case where it is desired to monitor a platform of a station as shown in FIG. 4 to FIG. 7, for example, if a threshold value is set to be larger than the size of a person walking on the platform 20 and smaller than the size of the train vehicle, a cluster of a large object such as the train 23 can be set as the background in step S8. In this manner, in a case where the train 23 is constructed by update and registration as part of the background or is initially registered, a background depth image 30 is obtained on a plane equivalent to a platform-side surface of the train as shown in FIG. 8. Thus, even if the train 23 thereafter enters/leaves as shown in FIG. 4 to FIG. 7, the train 23 and the wall 22 will not be extracted as a moving object desired to be extracted.

Note that the above method of determining a moving object from moving object candidate pixels is an example, and another method may be used. Also in that case, an object not determined as an extraction target in the other method is set as a background pixel.

Description will be made further using a platform of a station as an example.

Figure 4:
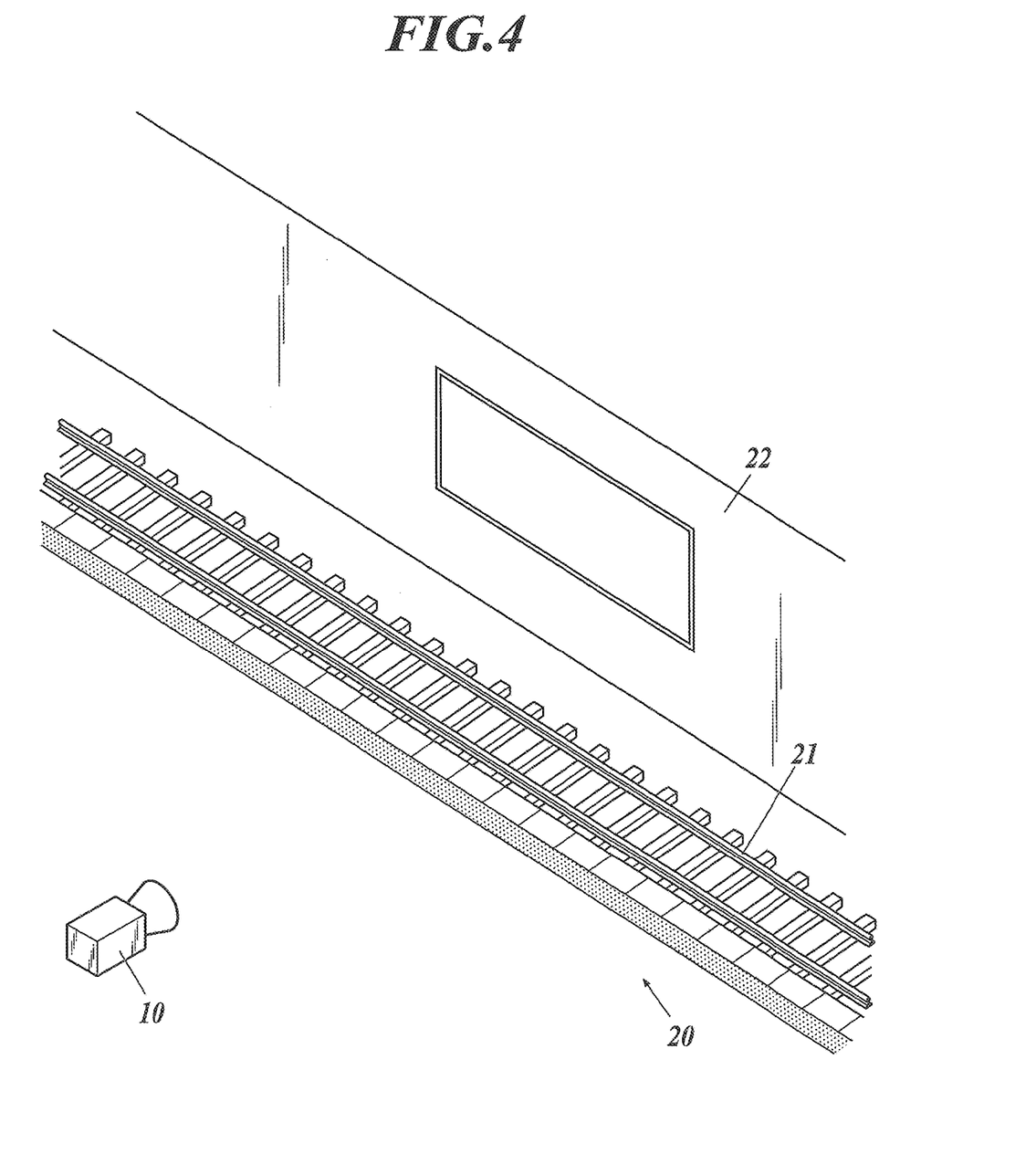
FIG. 4 is a schematic view showing a situation in which a depth image detection device such as a laser radar is installed with a platform of a train station set as a detection target.
Figure 5:
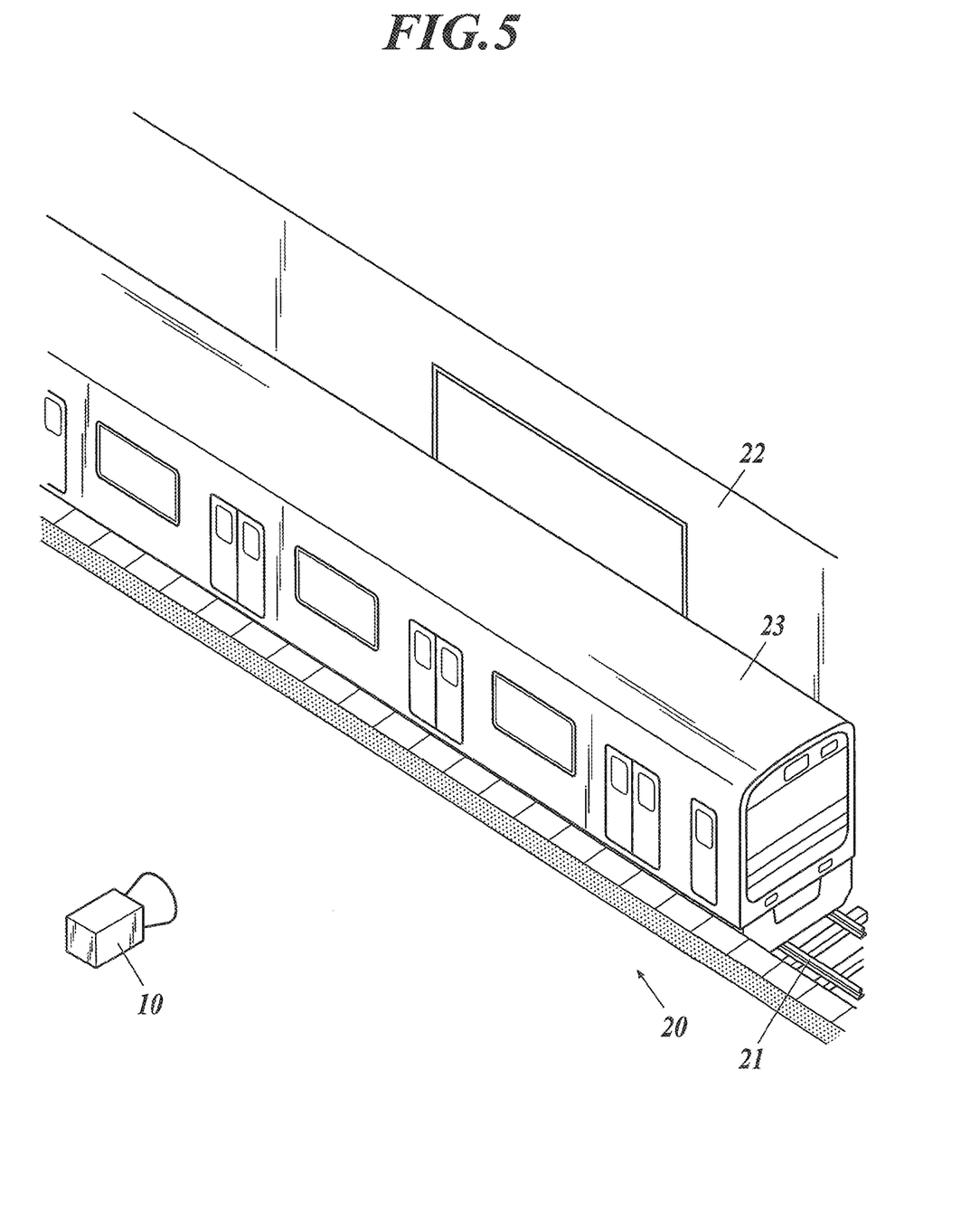
FIG. 5 is a schematic view showing a situation changed from FIG. 4.

In the example of a platform of a station as shown in FIG. 4 to FIG. 7, assume that the background is acquired at first while neither the train 23 nor the person 11 is present (FIG. 4). Thereafter, when a depth image is acquired, and moving object candidate pixels present on the nearer side than the background are extracted from the depth image, depth pixels from the person 11 to the train 23 are extracted as moving object candidate pixels in the situation shown in FIG. 6.

Figure 6:
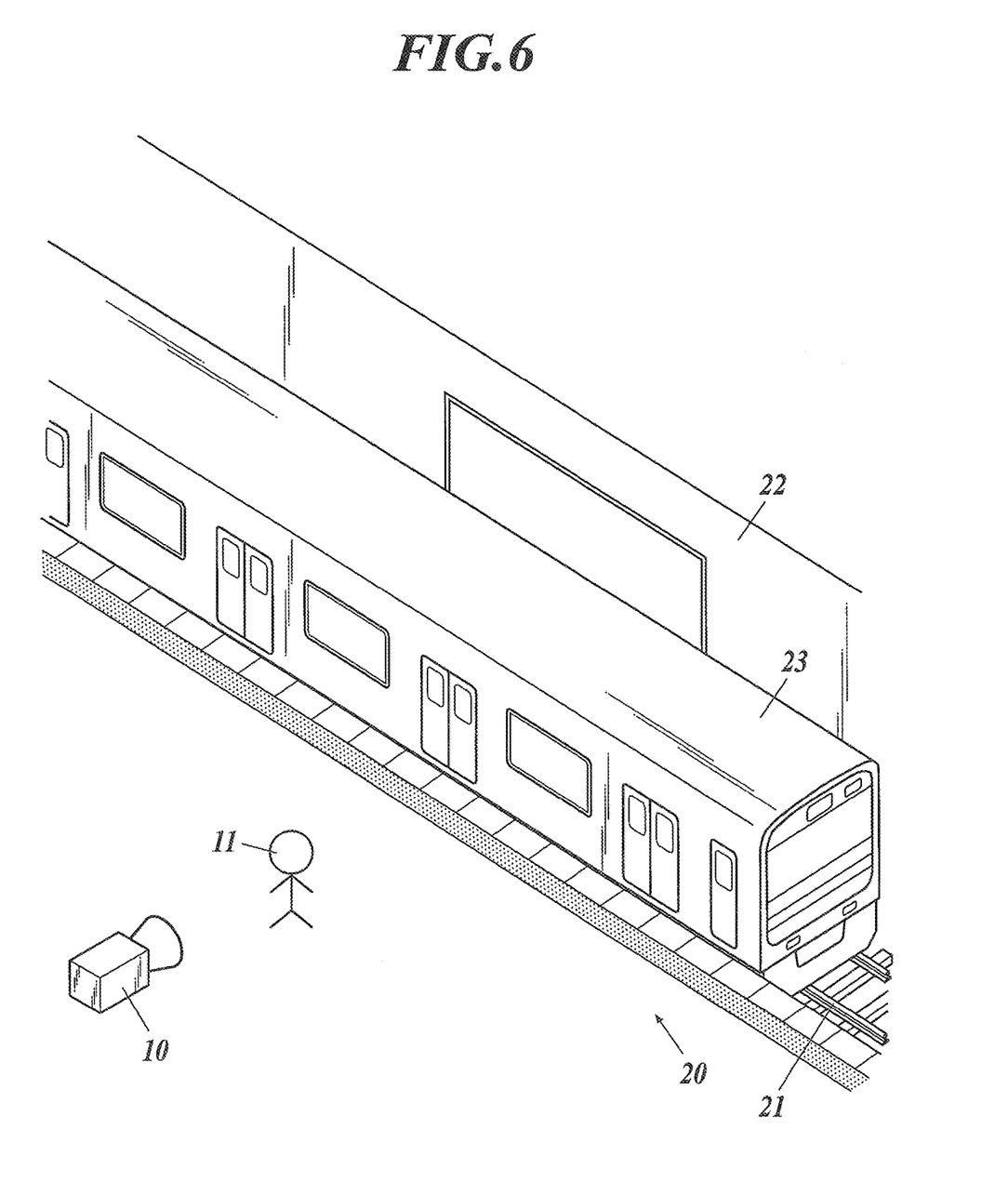
FIG. 6 is a schematic view showing another situation changed from FIG. 4.
Figure 7:
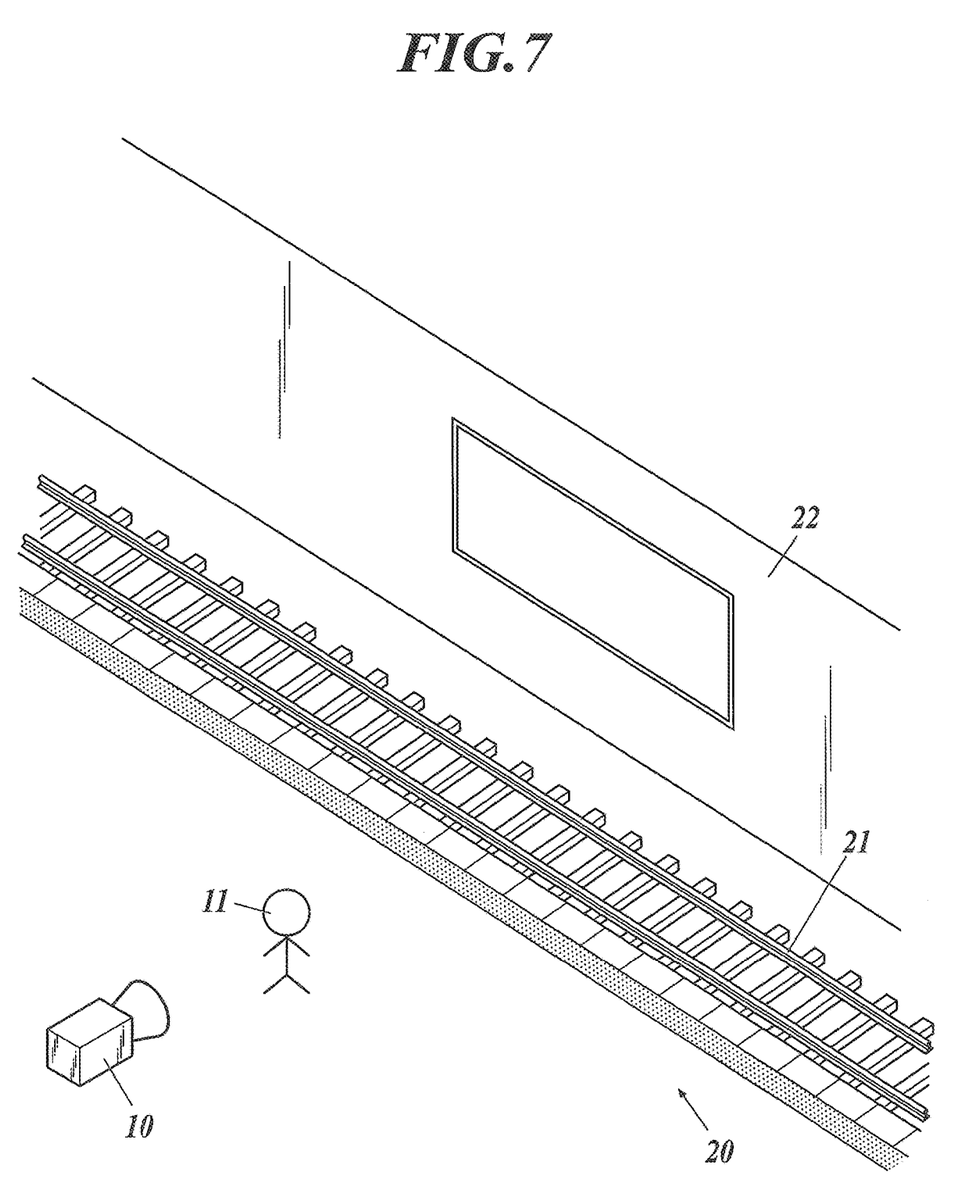
FIG. 7 is a schematic view showing still another situation changed from FIG. 4.

When the target is classified from here depending on the size as in step S7, a cluster composed of depth pixels up to the person 11 becomes an extraction target, and a cluster composed of depth pixels up to the train 23 falls outside the extraction target, and the cluster composed of the depth pixels up to the train 23 is registered as the background.

Then, depth pixels present on the nearer side than a background depth image partly composed of the depth pixels up to the train 23 become moving object candidate pixels in the next and subsequent turns, and only the person 11 or the like present on the nearer side than the train 23 will be extracted as a moving object desired to be extracted.

If this is repeated several times, a background in a state where the train 23 exists is generated even if part of the train 23 is blocked partway by the person 11.

After completion of the background, update of the background may be stopped. Since it is not easy to determine whether or not the background has been completed correctly, measures for having a user make sure in the following manner may be taken.

Figure 9:
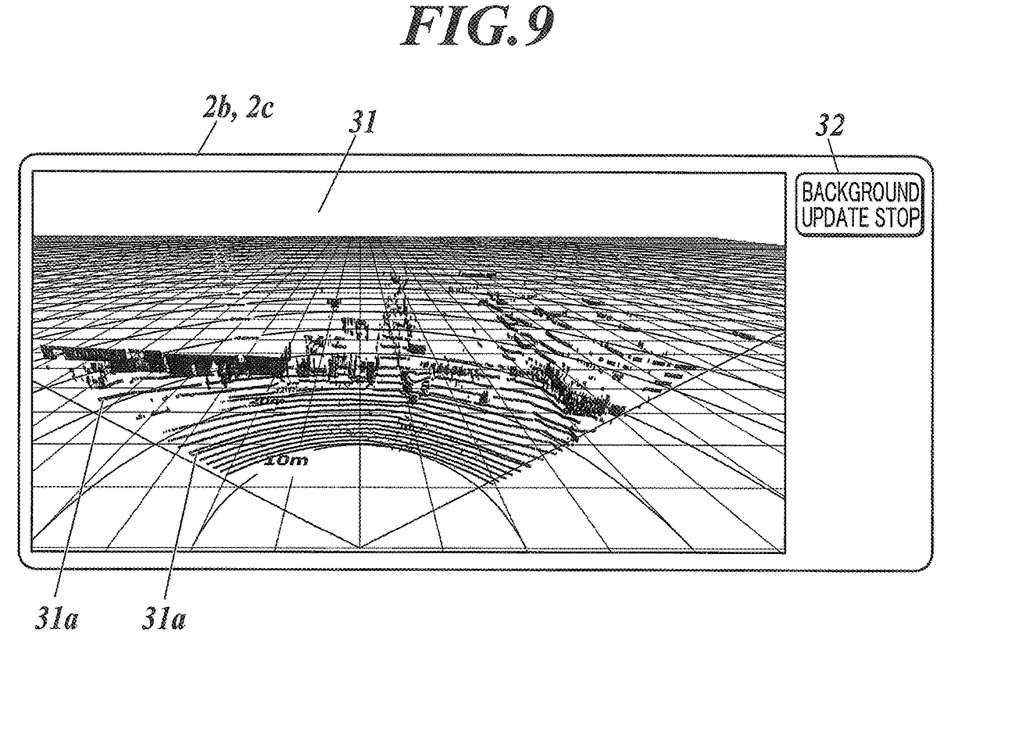
FIG. 9 is a diagram showing a display example of most recent background depth images obtained by the object detection system according to an embodiment of the present invention and a background update stop button.

That is, the moving object extractor 2 provides a device for having a user make sure by displaying most recent background depth images on a display 2b and for the user to input an instruction to stop update of the background, by means of the display 2b and an operation interface 2c. FIG. 9 shows a display example of most recent background depth images and a background update stop button. In FIG. 9, most recent background depth images 31a are plotted in a main display region 31, and depth auxiliary lines are also displayed. In FIG. 9, black strip-like objects indicate the background depth images 31a. If the user checks such a display and presses a background update stop button 32 by clicking a mouse or touching the screen, update of the background is stopped.

According to the object detection system 1 of the present embodiment as described above, irrespective of a background situation of a moving object desired to be extracted, the moving object to be extracted can be extracted accurately.

INDUSTRIAL APPLICABILITY

The present invention can be utilized for detection of an object.

REFERENCE SIGNS LIST 1 object detection system
2 moving object extractor
2a memory
10 depth image detection device (depth image detector)
11 person
12 glass
13 virtual image
15 fence
20 platform
21 track
22 wall
23 train
30 background depth image
31a background depth image
32 background update stop button

What is claimed is:

1. An object detection system comprising:
a depth image detector that detects a depth image from an external environment; and
a moving object extractor that extracts a moving object desired to be extracted from the depth image,
wherein the moving object extractor registers in advance the depth image in a memory as a background while the moving object to be extracted does not exist, and extracts only a pixel whose current depth is present on a nearer side than a depth of the background as a candidate for a pixel corresponding to the moving object to be extracted;
wherein the moving object extractor further makes a determination to extract, as the moving object to be extracted, a pixel from a pixel group composed of pixels of the candidates having been extracted, and for a portion not extracted as the moving object to be extracted, updates and registers a depth of the pixel in the memory as the depth of the background; and
wherein the moving object extractor determines a size of the pixel group, compares the size of the pixel group to a threshold value, and when the size of the pixel group exceeds the threshold value the pixel group is registered as background.

2. The object detection system according to claim 1, wherein when determining whether a pixel is present on a nearer side than the background registered in the memory, the moving object extractor sets a minimum threshold value of a changing depth, and extracts only a pixel present on a nearer side than the depth of the background by more than or equal to the threshold value as a candidate for a pixel corresponding to the moving object to be extracted.

* * * * *